(12) United States Patent
Patel

(10) Patent No.: US 9,808,757 B2
(45) Date of Patent: Nov. 7, 2017

(54) SYSTEMS AND METHODS FOR SEQUESTERING CO2

(71) Applicant: Dhansukhbhai V. Patel, Vestavia Hills, AL (US)

(72) Inventor: Dhansukhbhai V. Patel, Vestavia Hills, AL (US)

(73) Assignee: THE SOUTHERN COMPANY, Atlanta, GA (US)

(*) Notice: Subject to any disclaimer, the term of this patent is extended or adjusted under 35 U.S.C. 154(b) by 136 days.

(21) Appl. No.: 13/909,732

(22) Filed: Jun. 4, 2013

(65) Prior Publication Data
US 2013/0319230 A1 Dec. 5, 2013

Related U.S. Application Data

(60) Provisional application No. 61/655,337, filed on Jun. 4, 2012.

(51) Int. Cl.
  *B01D 53/22* (2006.01)
  *B01D 53/14* (2006.01)
  *B01D 53/62* (2006.01)

(52) U.S. Cl.
  CPC ......... *B01D 53/22* (2013.01); *B01D 53/1475* (2013.01); *B01D 53/1481* (2013.01);
  (Continued)

(58) Field of Classification Search
  CPC  Y02C 10/10; B01D 53/228; B01D 2257/504; B01D 53/22; B01D 71/64;
  (Continued)

(56) References Cited

U.S. PATENT DOCUMENTS 3,228,394 A * 1/1966 Ayres ................... 128/200.25
3,475,121 A * 10/1969 Thornton ............. B01D 53/508
                                                 423/244.07

(Continued)

FOREIGN PATENT DOCUMENTS

WO     2004054688 A1    7/2004
WO  WO 2004/054688 A1 * 7/2004
WO     2009070273 A1    6/2009

OTHER PUBLICATIONS

"Solution, n." OED Online. Oxford University Press, Sep. 2015. p. 1, Web oed.com. Nov. 14, 2015.*

(Continued)

*Primary Examiner* — Jason M Greene
(74) *Attorney, Agent, or Firm* — Troutman Sanders LLP; Ryan A. Schneider; Dustin B. Weeks

(57) ABSTRACT

An exemplary embodiment of the present invention provides a carbon-dioxide ("CO2") sequestration system comprising a CO2 source, a process-water source, a membrane module, and a sequestration duct. The membrane module comprises a first section, a second section, and a membrane. The first section can be configured to receive gaseous CO2 at a first pressure from the CO2 source. The second section can be configured to receive process-water at a second pressure from the process-water source, wherein the first pressure is greater than the second pressure. The membrane can be positioned between the first section and the second section and can comprise a plurality of apertures configured such that the gaseous CO2 passes through the plurality of apertures and dissolves into the process-water to form a process-water-CO2-solution. The sequestration duct can be in fluid communication with the second section and configured to transport the process-water-CO2 solution to a sequestration site.

18 Claims, 8 Drawing Sheets

(52) U.S. Cl.
CPC ........... *B01D 53/229* (2013.01); *B01D 53/62* (2013.01); *B01D 2257/504* (2013.01); *Y02C 10/04* (2013.01); *Y02C 10/10* (2013.01)

(58) Field of Classification Search
CPC ............ B01D 53/1468; B01D 53/1475; B01D 53/1481; B01D 53/226; B01D 53/229; B01D 53/62
See application file for complete search history.

(56) References Cited

U.S. PATENT DOCUMENTS

| | | | |
|---|---|---|---|
| 3,615,198 A * | 10/1971 | Terrana | C01B 17/60 423/243.09 |
| 3,918,521 A * | 11/1975 | Snavely, Jr. | B01D 53/501 166/272.3 |
| 6,158,721 A * | 12/2000 | Katou et al. | 261/26 |
| 6,164,632 A * | 12/2000 | Uchida | A61H 33/02 261/102 |
| 6,589,359 B2 * | 7/2003 | Kamikawa et al. | 134/26 |
| 6,884,359 B2 * | 4/2005 | Kambe et al. | 210/749 |
| 7,132,090 B2 * | 11/2006 | Dziedzic | B01D 53/229 423/230 |
| 7,445,197 B2 * | 11/2008 | Ooyachi et al. | 261/36.1 |
| 7,469,883 B2 * | 12/2008 | Verhaverbeke et al. | 261/102 |
| 8,137,527 B1 * | 3/2012 | Woods | 205/555 |
| 8,357,270 B2 * | 1/2013 | Gilliam et al. | 204/263 |
| 8,366,917 B2 * | 2/2013 | Dana et al. | 208/311 |
| 8,882,967 B1 * | 11/2014 | Patel | 203/2 |
| 2002/0053355 A1 | 5/2002 | Kamikawa et al. | 134/30 |
| 2004/0123737 A1 | 7/2004 | Filippi et al. | |
| 2004/0200618 A1 * | 10/2004 | Piekenbrock | E21B 41/0057 166/305.1 |
| 2004/0219090 A1 * | 11/2004 | Dziedzic et al. | 423/437.1 |
| 2004/0238975 A1 * | 12/2004 | Sakakibara et al. | 261/100 |
| 2005/0133066 A1 * | 6/2005 | Takahashi | 134/25.4 |
| 2006/0245993 A1 * | 11/2006 | Magumbe | B01D 53/229 423/210 |
| 2007/0217981 A1 * | 9/2007 | Van Essendelft | B01D 53/1475 423/220 |
| 2008/0243094 A1 * | 10/2008 | Yamasaki et al. | 604/289 |
| 2009/0028774 A1 * | 1/2009 | Matsushita | B82Y 30/00 423/432 |
| 2010/0200466 A1 * | 8/2010 | Dana et al. | 208/390 |
| 2010/0300289 A1 * | 12/2010 | Jiang | 95/136 |
| 2011/0020205 A1 | 1/2011 | Kawamura et al. | |
| 2011/0030957 A1 * | 2/2011 | Constantz et al. | 166/305.1 |
| 2011/0135551 A1 | 6/2011 | House et al. | |
| 2011/0139455 A1 | 6/2011 | Kameyama et al. | |
| 2011/0245937 A1 * | 10/2011 | Rawson et al. | 700/90 |
| 2011/0300043 A1 * | 12/2011 | Sano | B01D 53/1475 423/220 |
| 2011/0315386 A1 * | 12/2011 | Dusseault | E21B 41/0064 166/305.1 |
| 2013/0098246 A1 | 4/2013 | Lee et al. | |
| 2013/0291891 A1 * | 11/2013 | Chuuman et al. | 134/3 |
| 2013/0319230 A1 * | 12/2013 | Patel | 95/51 |
| 2014/0319056 A1 * | 10/2014 | Fuchigami et al. | 210/648 |

OTHER PUBLICATIONS

"Bubble, n." OED Online. Oxford University Press, Sep. 2015. Web oed.com. p. 1, Nov. 14, 2015.*

"System" Collins Thesaurus of the English Language—Complete and Unabridged 2nd Edition. 2002 HarperCollins Publishers 1995, 2002 <http://www.thefreedictionary.com/system>.*

KOIDE "Carbon microbubbles sequestration: a novel technology for stable underground emplacement of greenhouse gases into wide variety of saline aquifers, fractured rocks and tight reservoirs" Energy Procedia 1 (2009) 3655-366 with presentation at 9th International Conference on Greenhouse Gas Technologies Nov. 16-20, 2008.*

Hwang "Fundamentals of membrane transport" Korean J. Chem. Eng., 28(1), 1-15 (2011).*

The International Search Report and Written Opinion for related Application No. PCT/US13/72002 dated May 2, 2014.

The International Preliminary Report on Patentability for related Application No. PCT/US13/72002 dated Dec. 17, 2015.

ATLAS COPCO, "ZM Oil-free multistage centrifugal pressure and vacuum blowers," 2013, pp. 1-7.

* cited by examiner

SYSTEMS AND METHODS FOR SEQUESTERING CO2

CROSS-REFERENCE TO RELATED APPLICATIONS

This application claims the benefit of U.S. Provisional Application Ser. No. 61/655,337, filed on 4 Jun. 2012, which is incorporated herein by reference in its entirety as if fully set forth below.

TECHNICAL FIELD OF THE INVENTION

The various embodiments of the present disclosure relate generally to gas sequestration systems and methods. More particularly, the various embodiments of the present invention are directed to systems and methods for sequestering carbon-dioxide ("CO2").

BACKGROUND OF THE INVENTION

CO2 capture technology continues to gain viability in making coal-fired and coal gasification generation competitive, environmentally-friendly options as compared to gas-fired generation. It is expected that 60-65% of the CO2 from coal-fired or gasification power plants needs to be removed from the exhaust of a coal-based generation system to make those systems equivalent to gas-fired generation systems. As CO2 capture technology continues to advance, however, conventional CO2 sequestration techniques have been unable to meet the ever increasing storage demands associated with conventional CO2 capture technology.

One conventional CO2 sequestration technique involves injecting CO2 into deep underground wells. Regulators have assured the public that deep well CO2 capture is safe by requiring that natural geologic caps be present to prevent release of CO2 to the Earth's surface. The use of natural geologic caps has been predicated on the use of pure CO2 injection into the ground. Pure CO2 sequestered from power plants has found conventional uses for either enhancing oil production or storage in "dome" features. The majority of power plants, however, are not in locations where these options are readily available, thus requiring lengthy and expensive pipelines to transport captured CO2 to such locations. Instead, a majority of power plants are located in areas where deep saline aquifers are present.

The saline aquifers in deep formations already have many of the ions needed to form long term storage carbonate minerals. Accordingly, conventional techniques have sought to capitalize on this characteristic by injecting gaseous or supercritical (free phase) CO2 directly into the aquifers. Free phase CO2 injection, however, suffers from the potential risk that the CO2 does not dissolve into aquifer water fast enough to remove the risk of release back to the Earth's surface. Specifically, the density of CO2 gas and liquid in the aquifer is much lower than that of native aquifer water, creating a strong tendency for the CO2 to make its way upward.

There are many other disadvantages associated with injecting gaseous CO2 directly into aquifers. For example, there is a potential for casing failure above the desired injection point. Any leakage in the deep well casing above the desired injection point can release CO2 gas and liquid into shallower formations, e.g., potable water supplies. Due to the fact that the CO2 gas is less dense than aquifer water, the risk of CO2 release to the Earth's surface is exacerbated. Additionally, CO2 leakage through the casing in a well injecting pure CO2 gas will not be detected quickly because any changes in well backpressure may be too small to be noticed in a reasonable timeframe due in part to the high pressures at which conventional wells operate. Further, for a gas, measurements of pressure, temperature, and volume flow rate are all needed to assess mass rate, thus making the assessment difficult to ascertain.

Another disadvantage to deep well injection of CO2 gas is the potential problems with CO2-hydrate formation in pipelines, near valves, and in injection wells. There may be a significant pressure drop from delivery pressure past the injection well choke or flow regulation valve. At startup, a significant pressure drop will also be present between the inside of the well and the aquifer so that gas cooling occurs. These pressure drops can cool the CO2 gas enough to promote the formation of CO2-hydrates as the gas enters the aquifer. Such hydrates may be slow to dissolve and also inhibit the flow of gas into the aquifer. One conventional solution for this problem is to use methanol injection with the gaseous CO2 into the well for hydrate inhibition, but such a solution both significantly raises costs associated with CO2 sequestration and creates an unsafe fire hazard.

Therefore, there is a desire for improved systems and methods for CO2 sequestration that overcome the disadvantages of conventional techniques discussed above. Various embodiments of the present invention address these desires.

BRIEF SUMMARY OF THE INVENTION

The present invention provides systems and methods for sequestering CO2. An exemplary embodiment of the present invention provides a CO2 sequestration system comprising a CO2 source, a process-water source, a membrane module, and a sequestration duct. The membrane module can comprise a first section, a second section, and a membrane positioned substantially between the first section and second section. The first section can be configured to receive gaseous CO2 at a first pressure from the CO2 source. The second section can be configured to receive process-water at a second pressure from the process-water source, wherein the first pressure is greater than the second pressure. The membrane can be positioned substantially between the first section and the second section. The membrane can comprise a plurality of apertures configured such that the gaseous CO2 in the first section passes through the plurality of apertures and dissolves into the process-water in the second section to form a process-water-CO2 solution. The sequestration duct can be in fluid communication with the membrane module and configured to transport the process-water-CO2 solution to a sequestration site.

In an exemplary embodiment of the present invention, the plurality of apertures have diameters less than 20 microns.

In an exemplary embodiment of the present invention, the sequestration site is a saline aquifer.

In another exemplary embodiment of the present invention, the first pressure and second pressure are such that the process-water-CO2 solution comprises CO2-microbubbles having a diameter less than a diameter of pores of the saline aquifer.

In still another exemplary embodiment of the present invention, the first pressure is no more than 10 PSI greater than the second pressure. In another exemplary embodiment of the present invention, the first pressure is no more than 30 PSI greater than the second pressure.

In another exemplary embodiment of the present invention, the CO2 source is configured to filter CO2 from a process gas.

In yet another exemplary embodiment of the present invention, the process-water source comprises a flue gas desulfurization system.

In still another exemplary embodiment of the present invention, the process-water comprises at least one of calcium, sodium, potassium, barium, iron, magnesium, copper, lead, cadmium, manganese, zinc, and strontium.

In another exemplary embodiment of the present invention, the membrane comprises a first tubular-shaped membrane with an interior volume of the first tubular-shaped membrane defining a first portion of the second section and with an exterior volume of the first tubular-shaped membrane defining a first portion of the first section.

In yet another exemplary embodiment of the present invention, the membrane further comprises a second tubular-shaped membrane with an interior volume of the second tubular-shaped membrane defining a second portion of the second section and with an exterior volume of the second tubular-shaped membrane defining a second portion of the first section.

In still another exemplary embodiment of the present invention, the membrane module further comprises a third section in fluid communication with the second section and the sequestration duct. In some embodiments, the third section comprises a filter membrane comprising a second plurality of apertures with each of the second plurality of apertures having a diameter less than a predetermined filter size selected based on at least one of a pressure and temperature of at least one of the process water and gaseous $CO_2$. In some embodiments, the filter membrane can be configured to prevent gaseous $CO_2$ bubbles having a diameter greater than the predetermined filter size from traversing across the filter membrane and entering the sequestration duct.

In addition to $CO_2$ sequestration systems, various embodiments of the present invention provide methods of sequestering $CO_2$. An exemplary embodiment of the present invention provides a method sequestering $CO_2$ comprising utilizing a membrane module, injecting gaseous $CO_2$ into a first section of the membrane module, such that the gaseous $CO_2$ is at a first pressure within the first section, injecting process-water into a second section of the membrane module, such that the process-water is at a second pressure within the second section that is less than the first pressure, dissolving the gaseous $CO_2$ into the process-water via a plurality of apertures to form a process-water-$CO_2$ solution, and transporting the process-water-$CO_2$ solution to a sequestration site via a sequestration duct.

In an exemplary embodiment of the present invention, the method comprises filtering the gaseous $CO_2$ from a process-gas.

In another exemplary embodiment of the present invention, the process-gas can be a process-gas from an electric power plant.

In yet another exemplary embodiment of the present invention, the process-water comprises a byproduct of a process-gas desulfurization process.

In still yet another exemplary embodiment of the present invention, the process-water-$CO_2$ solution in the sequestration duct is at a third pressure substantially equal to the second pressure in the second section of the membrane module. In another exemplary embodiment of the present invention, the process-water-$CO_2$ solution in the sequestration duct is at a third pressure substantially equal to or less than the second pressure in the second section of the membrane module.

In addition to systems and methods for $CO_2$ sequestration, exemplary embodiments of the present invention provide devices for use in $CO_2$ sequestration systems. An exemplary embodiment of the present invention provides a membrane module for use in a $CO_2$ sequestration system, the membrane module comprising a first section, a second section, and a membrane positioned substantially between the first section and the second section. The first section can be at a first pressure and configured to receive gaseous $CO_2$ from a $CO_2$ source. The second section can be at a second pressure and configured to receive process-water from a process-water source. The membrane module can comprise a plurality of apertures and can be configured such that the gaseous $CO_2$ in the first section dissolves into the process-water in the second section via the plurality of apertures.

In another exemplary embodiment of the present invention, the membrane comprises a first tubular-shaped membrane with an interior volume of the first tubular-shaped membrane defining a first portion of the second section and with an exterior volume of the first tubular-shaped membrane defining a first portion of the first section.

In yet another exemplary embodiment of the present invention, the membrane comprises a second tubular-shaped membrane with an interior volume of the second tubular-shaped membrane defining a second portion of the second section and with an exterior volume of the second tubular-shaped membrane defining a second portion of the first section.

In still another exemplary embodiment of the present invention, the membrane module further comprises a third section in fluid communication with the second section. In some embodiments, the third section comprises a filter membrane comprising a second plurality of apertures with each of the second plurality of apertures having a diameter less than a predetermined filter size selected based on at least one of a temperature and pressure of at least one of the process water and gaseous $CO_2$. In some embodiments, the filter membrane can be configured to prevent gaseous $CO_2$ bubbles having a diameter greater than the predetermined filter size from moving traversing across the filter membrane.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. While one or more embodiments may be discussed as having certain advantageous features, one or more of such features may also be used with the various embodiments of the invention discussed herein. In similar fashion, while exemplary embodiments may be discussed below as system or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

DETAILED DESCRIPTION OF THE INVENTION

To facilitate an understanding of the principles and features of the present invention, various illustrative embodiments are explained below. In particular, the invention is described in the context of being systems, methods, and devices for CO2 sequestration. Embodiments of the present invention may be applied to many systems where it is desirable to store or sequester CO2, including, but not limited to, fossil fuel and gasification electric power plants, cement plants, manufacturing plants, and the like.

The components described hereinafter as making up various elements of the invention are intended to be illustrative and not restrictive. Many suitable components or steps that would perform the same or similar functions as the components or steps described herein are intended to be embraced within the scope of the invention. Such other components or steps not described herein can include, but are not limited to, for example, similar components or steps that are developed after development of the invention.

Figure 1:
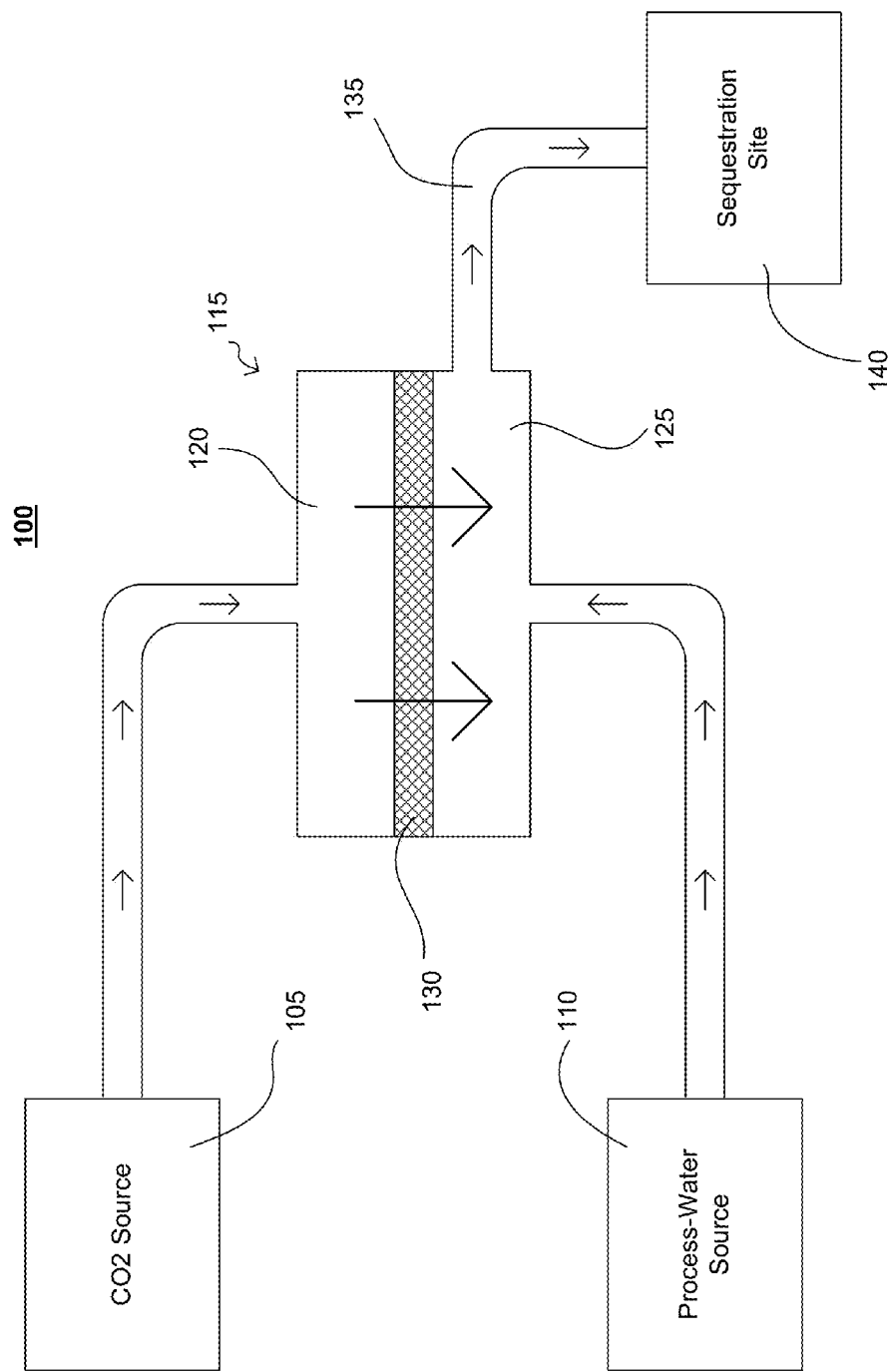
FIG. 1 illustrates a CO2 sequestration system, in accordance with an exemplary embodiment of the present invention.

As shown in FIG. 1, an exemplary embodiment of the present invention provides a CO2 sequestration system 100 comprising a CO2 source 105, a process-water source 110, a membrane module 115, and sequestration duct 135. The membrane module 115 can comprise a first section 120, a second section 125, and a membrane 130 positioned substantially between the first section 120 and the second section 125.

In some embodiments of the present invention, the first section 120 can be in fluid communication with the CO2 source 105 and configured to receive CO2 from the CO2 source 105. The CO2 source 105 can be many CO2 sources known in the art. In an exemplary embodiment of the present invention, the CO2 source 105 comprises gaseous CO2. In another exemplary embodiment of the present invention, gaseous CO2 can comprise impurities, including, but not limited to, hydrogen sulfide, sulfur, water vapor, oxygen, nitrogen, ammonia, nitrous oxides, sulfur oxides, glycol, hydrocarbons, organic compounds, and the like. In an exemplary embodiment of the present invention, the gaseous CO2 has a concentration of at least 50% pure CO2. In another exemplary embodiment of the present invention, the gaseous CO2 has a concentration of at least 75% pure CO2. Accordingly, some embodiments of the present invention are operable over a wide range of the quality of CO2-rich gas injection into the first section 120. For example, in some embodiments of the present invention, the CO2-rich gas feed can vary from 0-100% of design capacity without adverse effects on the rate of water injection or process reliability. In yet another exemplary embodiment of the present invention, the CO2 source 105 comprises a subsystem configured to filter CO2 from a process-gas, such as a flue gas from an industrial plant. The gaseous CO2 in the first section 120 can be at many different temperatures. In an exemplary embodiment of the present invention, the gaseous CO2 in the first section 120 is maintained a temperature high enough to prevent the formation of CO2 liquid within the first section 120, depending on the pressure of the gaseous CO2 in the first section 120.

In some embodiments of the present invention, the second section 125 can be in fluid communication with the process-water source 110 and configured to receive process-water from the process-water source 110. The process-water source 110 can be many process-water sources known in the art configured to provide a process-water. In an exemplary embodiment of the present invention, the process-water source 110 comprises a flue gas desulfurization system. In an exemplary embodiment of the present invention, the process-water source 110 comprises liquid process-water. The process-water can be many process-waters known in the art. As used herein, process-water does not mean pure deionized water. Instead, as used herein, the term "process-water" or "process water" should be construed to mean one or more of the waters used in one or more of the various operating processes at plants or waters derived from rainfall directly of after interaction with process materials, other than pure deionized water. In an exemplary embodiment of the present invention, the process-water has a pH value no greater than eight. In some exemplary embodiments of the present invention, the process-water comprises at least one element or compound from a group, including, but not limited to, aluminum, ammonia, arsenic, barium, boron, calcium, chloride, sodium, bromide, barium, iron, magnesium, copper, lead, cadmium, manganese, zinc, strontium, chromium, fluoride, mercury, molybdenum, nickel, nitrate, orthophosphate, potassium, selenium, silica, silver, sodium, sulfate, thallium, vanadium, zinc, and the like. In some embodiments of the present invention, the process-water contains a low concentration of chloride, thus increasing the CO2 solubility of the process-water. In an exemplary embodiment of the present invention, the process-water contains a chloride concentration of less than 50,000 mg/L. In another exemplary embodiment of the present invention, the process-water contains a chloride concentration of less than 40,000 mg/L. In an exemplary embodiment of the present invention, the process-water contains a chloride concentration of less than 25,000 mg/L.

As discussed above, the first section 120 of the membrane module 115 can receive gaseous CO2 from the CO2 source 105. The gaseous CO2 can be at a first pressure within the first section 120. The second section 125 of the membrane module 115 can receive process-water from the process-water source 110. The process-water can be at a second pressure in the second section 125. In an exemplary embodiment of the present invention, the first pressure is greater than the second pressure.

Figure 2:
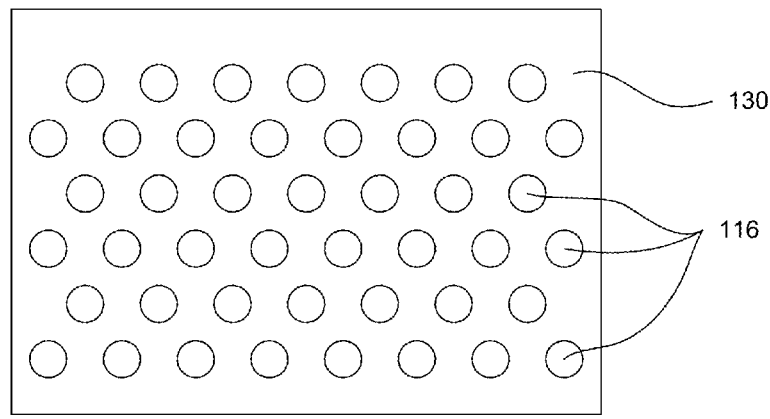
FIG. 2 provides a top view of a membrane for a membrane module, in accordance with an exemplary embodiment of the present invention.
Figure 3:
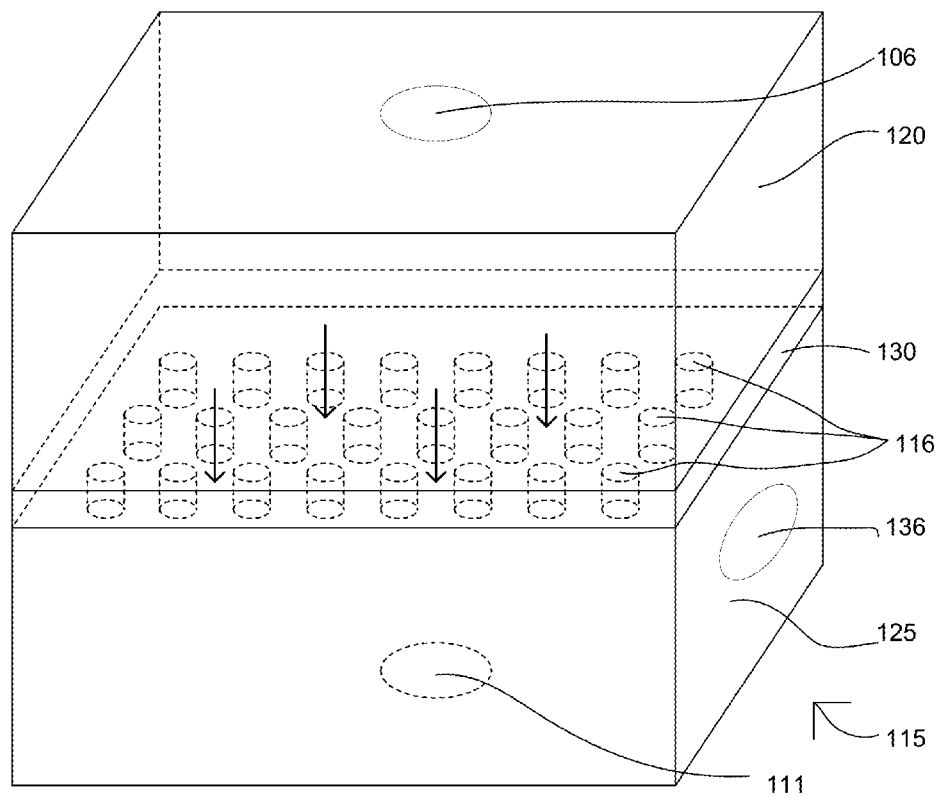
FIG. 3 provides a three-dimensional view of a membrane module, in accordance with an exemplary embodiment of the present invention.

As shown in FIGS. 2 and 3, in some embodiments of the present invention, the membrane module comprises a first section 120, a second section 125, and a membrane 130 positioned substantially between the first section 120 and the second section 125. In an exemplary embodiment of the present invention, the first section 120 can be configured to receive gaseous CO2 from the CO2 source 105 via a CO2 injection port 106. In another exemplary embodiment of the present invention, the second section 125 can be configured to receive process-water from the process-water source 110 via a process-water injection port 111.

In some embodiments of the present invention, the membrane 130 comprises a plurality of apertures 116. The apertures 116 can provide fluid communication between the first section 120 and the second section 125. In some embodiments of the present invention, the membrane 130 is configured such that gaseous CO2 in the first section 120 passes through the plurality of apertures 116 and dissolves into the process-water in the second section 125 to form a process-water-CO2 solution in the second section 125. Dissolving of the gaseous CO2 into the process-water can be controlled by the pressure difference between the first section 120 and the second section 125. For example, because the first pressure in the first section 120 is greater than the second pressure in the second section 125 in some embodiments of the present invention, gaseous CO2 in the first section 120 can be forced through the apertures 116 and dissolved into the process-water.

In some embodiments of the present invention, the pressure difference between the first section 120 and the second section 125 is relatively low to prevent large CO2 bubbles from forming in the process water. The magnitude of the difference between the first pressure and the second pressure can vary depending on a number of factors, including, but not limited to, the size/diameter of the apertures 116 and the temperature of the CO2 and/or process-water. In an exemplary embodiment of the present invention, the first pressure is no more than 5 PSI greater than the second pressure. In another exemplary embodiment of the present invention, the first pressure is no more than 10 PSI greater than the second pressure. In yet another exemplary embodiment of the present invention, the first pressure is no more than 20 PSI greater than the second pressure.

In some embodiments of the present invention, the system comprises a sequestration duct 135 in fluid communication with the second section 125 of the membrane module. The sequestration duct 135 can be configured to transport the process-water-CO2 solution out of the second section 125 and to a sequestration site 140. In an exemplary embodiment of the present invention, the process-water-CO2 solution exits the second section 125 via an ejection port 136 to enter the sequestration duct 135.

The sequestration site 140 can be many sequestration sites known in the art. In an exemplary embodiment of the present invention, the sequestration site 140 is a saline aquifer. The saline aquifer can have pores through which CO2 microbubbles in the process-water-CO2 solution can pass. The size/diameter of these pores can be measured by many geological analysis techniques known in the art. In some embodiments of the present invention, the first pressure and second pressure in the membrane module 115 are such that CO2 microbubbles are formed in the process-water-CO2 solution having a diameter less than the diameter of the pores of the saline aquifer.

Figure 4:
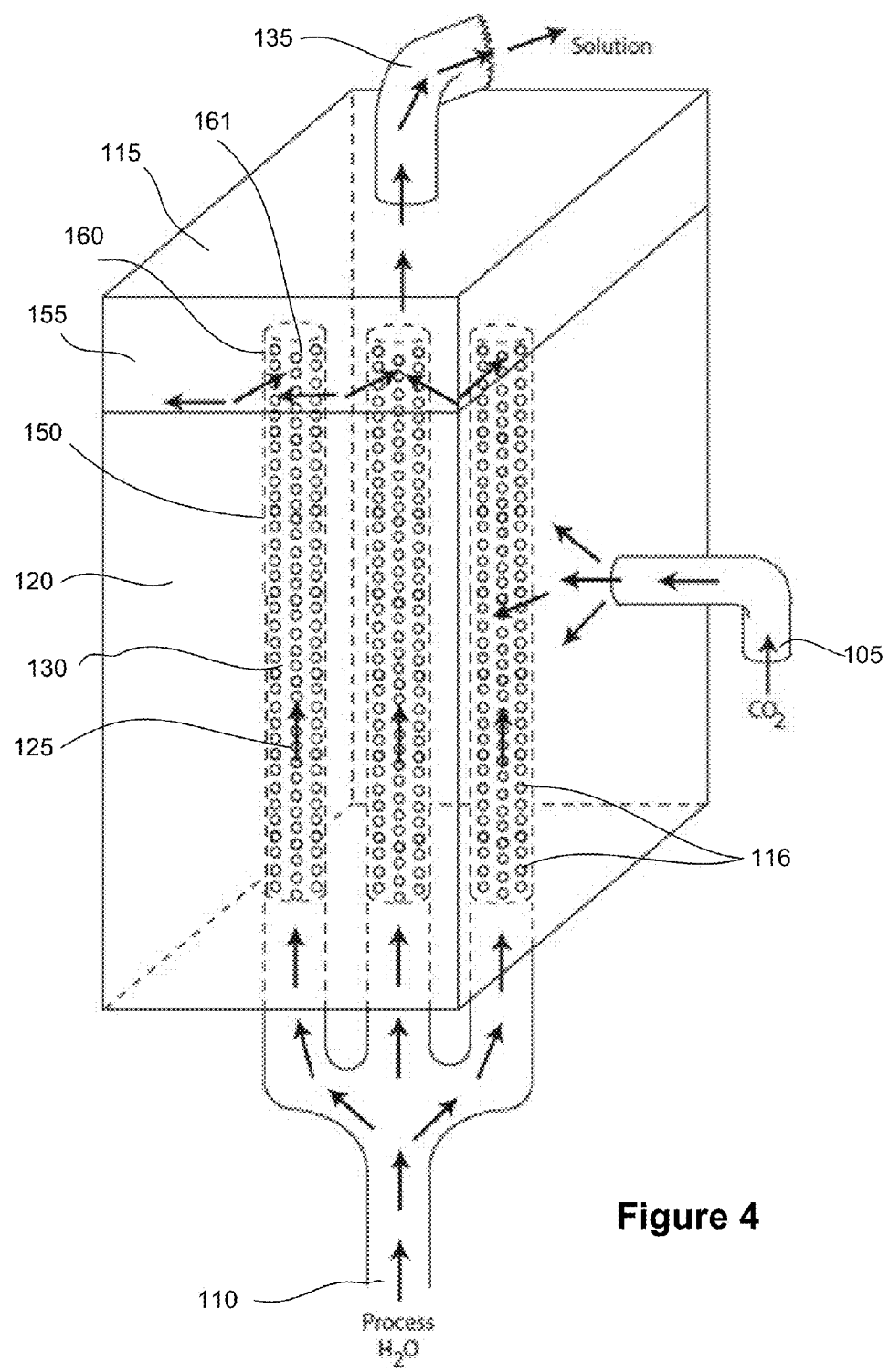
FIG. 4 provides a three-dimensional view of a membrane module, in accordance with an exemplary embodiment of the present invention.

As shown in FIG. 4, in an exemplary embodiment of the membrane module 115 comprises one or more tubes 150 extending within the membrane module 115. The tubes 150 can be defined by a membrane 130 comprising a plurality of apertures 116. The interior volume of the one or more tubes 150 can define portions of the second section 125. The exterior volume of the one or more tubes 150 can define portions of the first section 120. Thus, in an exemplary embodiment of the present invention, the membrane 130 comprises a first tubular-shaped membrane with an interior volume of the first tubular-shaped membrane defining a first portion of the second section 125 and with an exterior volume of the first tubular-shaped membrane defining a first portion of the first section 120. In another exemplary embodiment of the present invention, the membrane further comprises a second tubular-shaped membrane with an interior volume of the second tubular-shaped membrane defining a second portion of the second section 125 and with an exterior volume of the second tubular-shaped membrane defining a second portion of the first section 120.

As also shown in FIG. 4, the membrane module 115 can further comprise a third section 155. The third section 155 can be in fluid communication with a sequestration duct 135 and the second section 125. In some embodiments, the third section 155 comprises a filter membrane 160 comprising a plurality of apertures 161. Each of the plurality of apertures 161 can have a diameter less than a predetermined filter size. The predetermined filter size can be selected based on at least one of a pressure and temperature of at least one of the process water and gaseous CO2 in order to limit gaseous CO2 bubbles having a diameter greater than the predetermined filter size from traversing across the filter membrane 160 and entering the sequestration duct 135. For example, the third section 155 can comprise a portion of the one or more tubes 150. In some embodiments of the present invention, the portion of the one or more tubes 150 in the third section 155 can comprise a plurality of apertures 161. In some embodiments, the plurality of apertures 161 in one or more tubes 150 in the third section 155 can have a larger cross sectional area than the plurality of apertures 116 on the portion of the one or more tubes 150 on the second section 125.

In an exemplary embodiment of the present invention, the membrane module 115 illustrated in FIG. 4 operates as follows. Process water can enter the interior volume of the one or more tubes 150 via a process water inlet and traverse through the one or more tubes 150 towards the third section 155. CO2 can enter the first section 120 of the membrane module 115 via a CO2 inlet. In some embodiments the pressure of the CO2 in the first section 120 is greater than the pressure of the process water within the interior of the tubes 150, such that the CO2 diffuses across the membrane 130, e.g., apertures 116 on the tube 150, into the process water, thus creating a process-water-CO2 solution. In an exemplary embodiment the process-water solution can then exit the tubes 150 can enter the sequestration duct 135 for injection. In another exemplary embodiment, the process-water-CO2 solution can then enter the third section 155 of the membrane module 115 where the process-water-CO2 solution exits the tubes 155 via a plurality of apertures 161. The apertures 161 can be sized to limit the number of gaseous CO2 bubbles in the process-water-CO2 solution. After exiting the tubes 155, the process-water-CO2 solution can then enter the sequestration duct 135 for injection.

Figure 5:
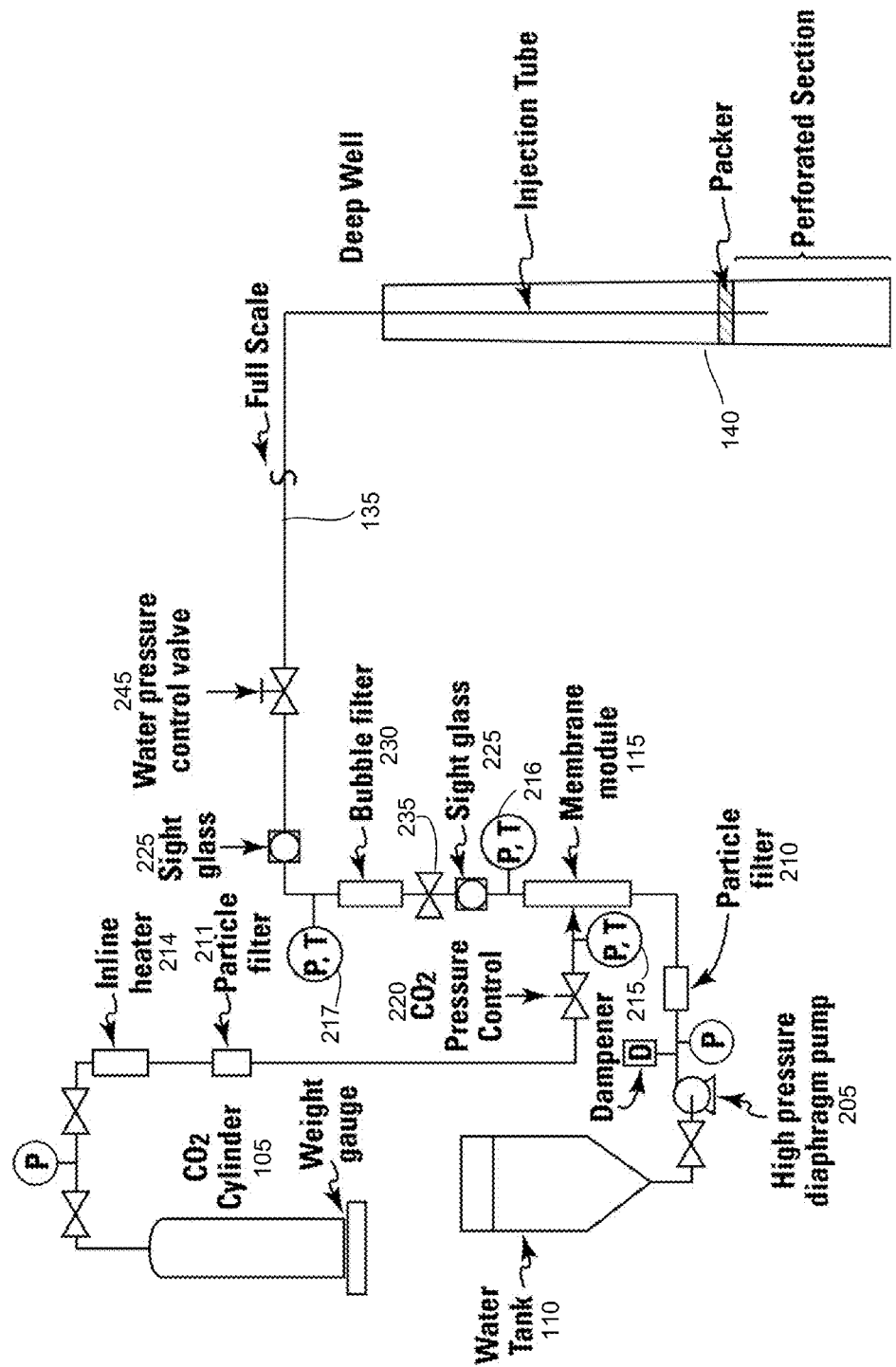
FIG. 5 illustrates a CO2 sequestration system, in accordance with an exemplary embodiment of the present invention.
Figure 6:
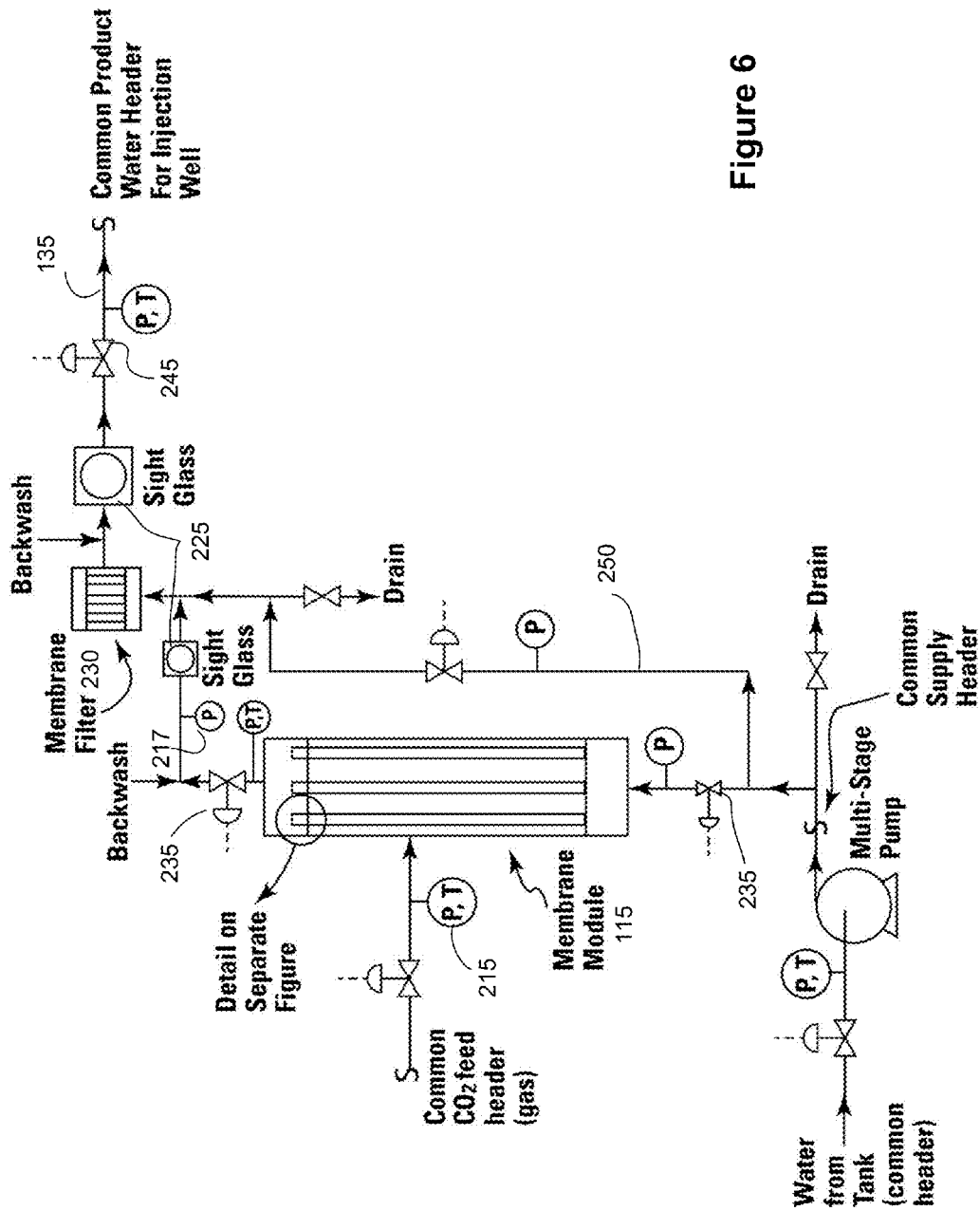
FIG. 6 illustrates a CO2 sequestration system, in accordance with an exemplary embodiment of the present invention.
Figure 7:
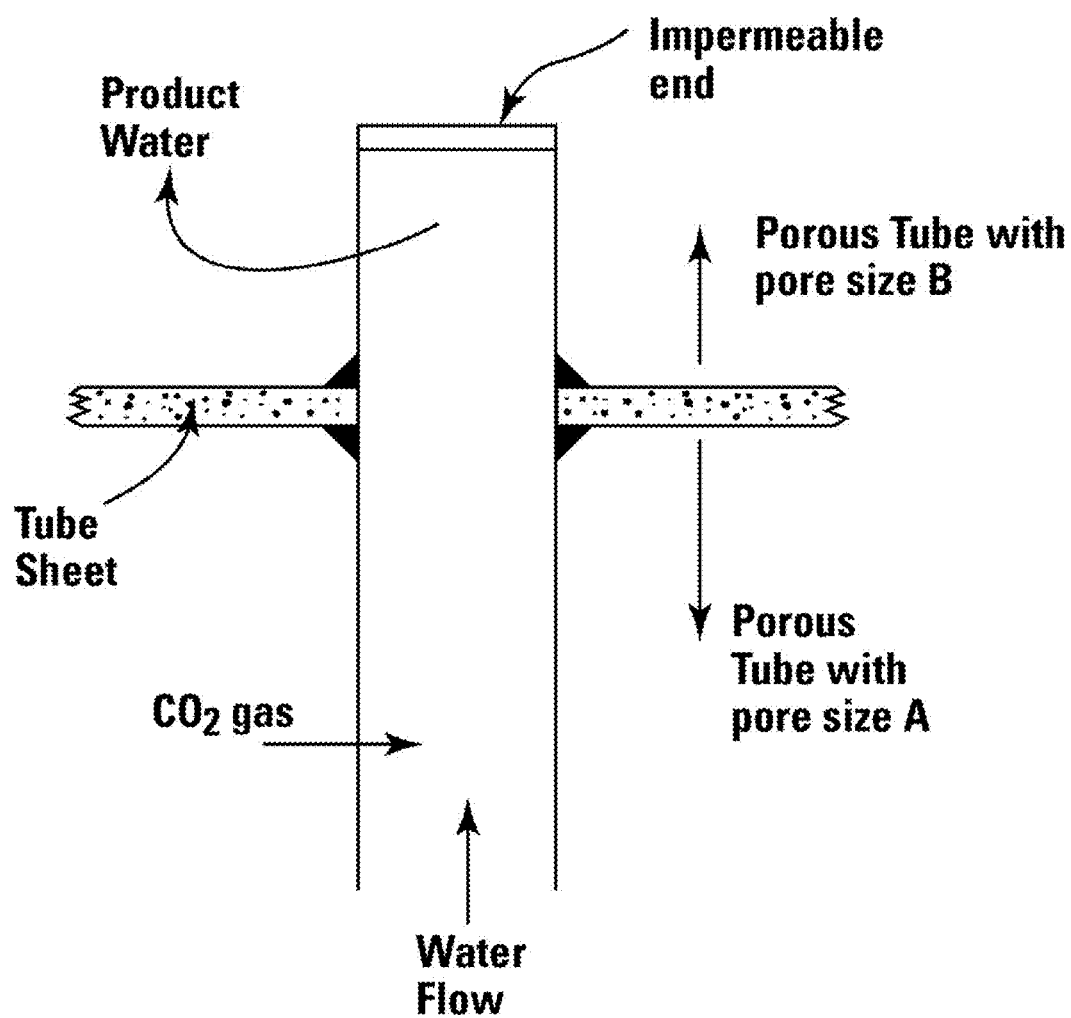
FIG. 7 illustrates a detail of the membrane module indicated in FIG. 6 for the CO2 sequestration system, in accordance with an exemplary embodiment of the present invention.
Figure 8:
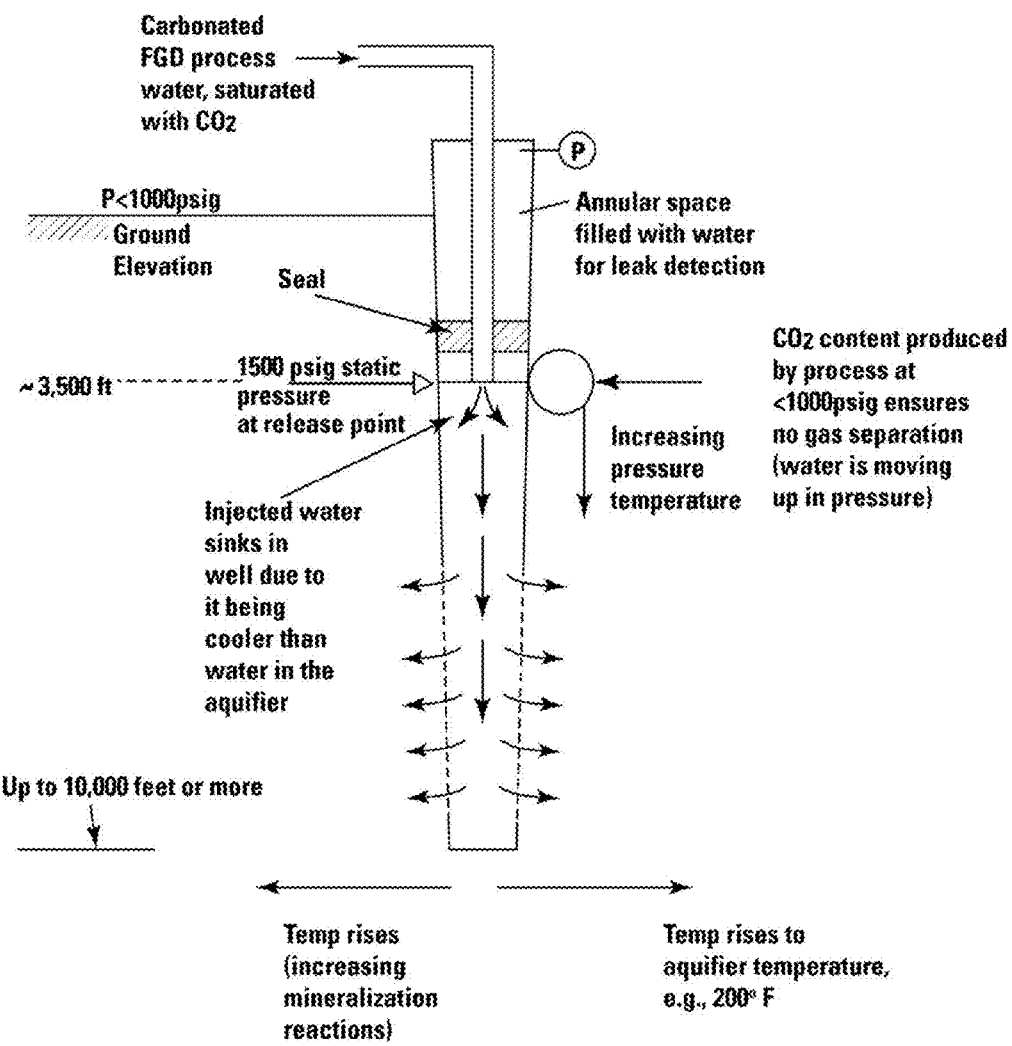
FIG. 8 illustrates a Pressure Equalization sequence, in accordance with an exemplary embodiment of the present invention.
Figure 9:
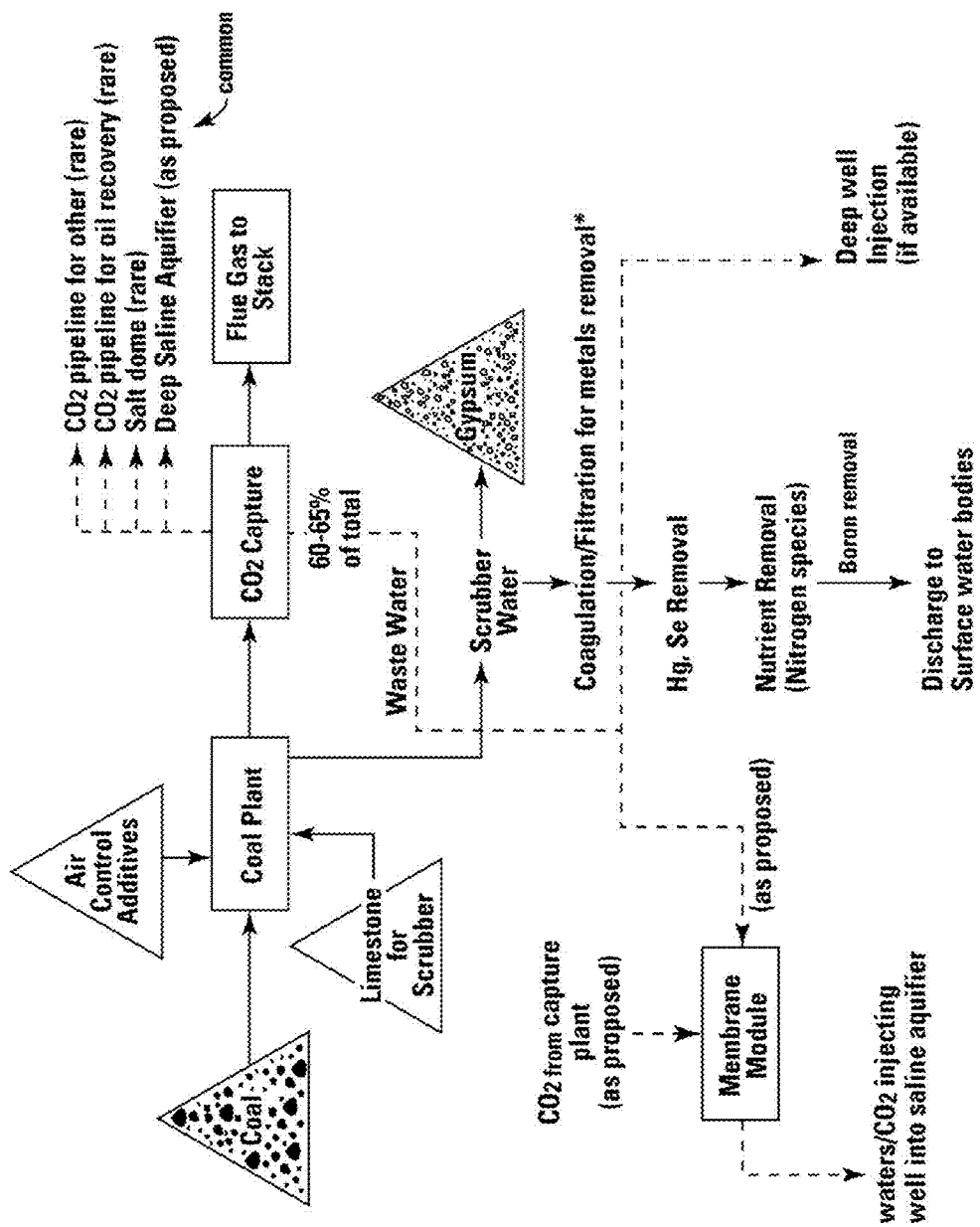
FIG. 9 illustrates how the CO2 sequestration system may integrate with operation of a coal-fired power plant, in accordance with an exemplary embodiment of the present invention.

As shown in FIG. 1, in accordance with an exemplary embodiment of the present invention, a process level CO2 sequestration system comprises a process-water source 110, a CO2 source 105, a membrane module 115, and a sequestration duct 135 leading to a sequestration site 140. FIGS. 5 and 6, however, contemplate additional optional features that will be appreciated by those skilled in the art to provide additional benefits to the system shown in FIG. 1.

For example, in some embodiments, of the present invention, the system can further comprise a water pump 205 for pumping the process water to through the process water inlet of the membrane module. The water pump 205 can be many water pumps known in the art.

In some embodiments of the present invention as shown in FIG. 5, the system can further comprise a particle filter 210 for filtering particulate material from the process water prior to the process water entering the process water inlet of the membrane module 115. In some embodiment of the present invention, the system can further comprise a particle filter 211 for filtering particulate material from the CO2 prior to the CO2 entering the CO2 inlet of the membrane module 115.

In some embodiments of the present invention, the system can further comprise a heater 214. In some embodiments, the heater 214 can heat the CO2 from the CO2 source prior to the CO2 entering the CO2 inlet of the membrane module 115. In some embodiments of the present invention, the system can further comprise a heater (not shown) for heating the process water to a desired temperature prior to the process water entering the process water inlet of the membrane module 115.

In some embodiments of the present invention, the system can comprise a pressure control valve 220 for controlling the pressure of the CO2 entering the CO2 inlet of the membrane module 115. The pressure control valve 220 can be many different valves or combinations of valves known in the art.

In some embodiments of the present invention, the system can comprise one of more inspection points 225 for inspecting the process-water-CO2 solution after it exits the membrane module. In some embodiments of the present invention, the inspection points 225 can be sight glasses to allow for visual inspection of the process-water-CO2-solution. For example, a person or machine can visually inspect the solution through the sight glasses 225 to determine whether gaseous CO2 bubbles greater than a desired size are present in the solution. In some embodiments of the present invention, the inspection points 225 can comprise a machine taking readings with electromagnetic and/or sound waves to determine whether CO2 bubbles greater than a desired size are present in the solution. In some embodiments, the inspection points 225 can include a camera for transmitting visual data to a remote location for analyzing the process-water-CO2 solution. The inspection points can be used to ensure the process-water-CO2 solution remains at substantially a single phase. The presence of a single phase in the sight glass can be indicated by the absence of a separable CO2 phase that would occupy a portion of the sight glass window if present.

In some embodiments of the present invention as shown in FIG. 6, the system can further comprise a bubble filter 230 for filtering CO2 bubbles from the process-water-CO2 solution after its exits the membrane module. The bubble filter can be many filters known in the art. In some embodiments, the system comprises an inspection point 225 before the bubble filter 230. In some embodiments, the system comprises an inspection point 225 after the bubble filter 230. In some embodiments, the system comprises an inspection point 225 before and after the bubble filter 230.

In some embodiments of the present invention, the system can further comprise a water pressure control valve 235 for controlling the pressure of the process-water-CO2 solution in the sequestration duct 135. The water pressure control valve 235 can be many different valves known in the art.

In some embodiments of the present invention, the system can further comprise a valve 245 positioned after the membrane module 115. The valve 245 can be used to control the pressure of the process-water-CO2 solution in the sequestration duct 135. The valve can also be used to control the pressures within the membrane module 115.

In some embodiments of the present invention, the system can further comprise a bypass section 250 for bypassing the membrane module 115. For example, the bypass section can comprise a valve that when open, allows the process water to bypass the membrane module and flow to the sequestration duct. Accordingly, process water may continue to be pumped to the sequestration site when, for example, the CO2 source is temporarily depleted or out of order or when maintenance is required on one or more components of the system.

In addition to systems for CO2 sequestration, various embodiments of the present invention provide methods for sequestering CO2. An exemplary embodiment of the present invention provides a method of sequestering CO2 comprising utilizing a membrane module 115, injecting gaseous CO2 into a first section 120 of the membrane module 115, injecting process-water into a second section 125 of the membrane module 115, dissolving the gaseous CO2 into the process-water via a plurality of apertures 116 in a membrane 130 of the membrane module 115 to form a process-water-CO2 solution, and transporting the process-water-CO2 solution to a sequestration site 140 via a sequestration duct 135.

In an exemplary embodiment of the present invention, the gaseous CO2 in the first section 120 is at a first pressure. In another exemplary embodiment of the present invention, the process-water in the second section 125 is at a second pressure. As discussed above, in some embodiments of the present invention, the first pressure is greater than the second pressure. In yet another exemplary embodiment of the present invention, the method further comprises selecting the first and second pressure such that CO2 microbubbles are created in the process-water-CO2 solution having a diameter no greater than a diameter of pores of a saline aquifer, which serves a sequestration site. In still yet another exemplary embodiment of the present invention, the process-water-CO2 solution in the sequestration duct 135 is maintained at a third pressure. In some embodiments of the present invention, the third pressure is substantially equal to the second pressure within the second section 125. In some embodiments of the present invention, the third pressure is lower than the second pressure, thus accounting for pressure drop from the second section 125 to the sequestration site 140. In some embodiments of the present invention, the third pressure is substantially less than or equal to the second pressure within the second section 125.

In an exemplary embodiment of the present invention, the gaseous CO2 is injected into the first section 120 at a first temperature, and the process-water is injected into the second section 125 at a second temperature. In some embodiments of the present invention, the first temperature is greater than the second temperature.

In still another exemplary embodiment of the present invention, the method further comprises filtering the gaseous CO2 from a process gas prior to injecting the gaseous CO2 into the first section 120. In some embodiments of the present invention, the gaseous CO2 can be filtered from a flue gas of an electric power plant prior to injection into the first section 120.

In yet another exemplary embodiment of the present invention, the process-water-CO2 solution is maintained at a predetermined temperature in the sequestration duct 135. The predetermined temperature can be many different temperatures. In an exemplary embodiment of the present invention, the predetermined temperature is about 50° C. In an exemplary embodiment of the present invention, the predetermined temperature is less than 50° C.

In addition to systems and methods for CO2 sequestration, the present invention also provides devices for use in CO2 sequestration systems. An exemplary embodiment of the present invention provides a membrane module 115 for use in a CO2 sequestration system comprising a first section 120, a second section 125, and a membrane 130. The first section 120 can be at a first pressure and configured to receive gaseous CO2 for a CO2 source 105. The second section 125 can be at a second pressure and be configured to receive process-water from a process-water source 110. The membrane 130 can be positioned substantially between the first section 120 and the second section 125. In an exemplary embodiment of the present invention, as shown in FIG. 3, the membrane 130 can be positioned substantially perpendicular to side walls of the membrane module 115. In another exemplary embodiment of the present invention, as shown in FIG. 4, the membrane 130 can be positioned at a non-perpendicular angle to the side walls of the membrane module 115. In some embodiments of the present invention, the membrane 130 comprises a plurality of apertures 116. The apertures 116 can provide fluid communication between the first section 120 and the second section 125. The scope of the present invention is not limited to any particular size or shape of apertures 116. In an exemplary embodiment of the present invention, the apertures 116 are circular shaped. In some embodiments of the present invention, the plurality of apertures 116 can have sizes and shapes that are non-uniform. In another exemplary embodiment of the present invention, the apertures 116 have a diameter of less than 50 microns. In yet another exemplary embodiment of the present invention, the apertures 116 have a diameter less than 20 microns. In still yet another exemplary embodiment of the present invention, the apertures 116 have a diameter less than 10 microns. Thus, in some embodiments of the present invention, the membrane 130 is configured such that gaseous CO2 in the first section 120 can dissolve into process-water in the second section 125 to form a process-water-CO2 solution.

FIG. 5 illustrates a CO2 sequestration system 100, in accordance with another exemplary embodiment of the present invention. The system 100 comprises a CO2 source 105, a process-water source 110, and a membrane module 115. Process-water can be delivered from the process-water source 110 to the membrane module 115 by a water pump 205. Before entering the membrane module 115, the process-water can be filtered by a filter 210 to remove particles from the process-water. In an exemplary embodiment of the present invention, the filter 210 can remove particles larger than the pores of a saline aquifer where CO2 will be sequestered. Gaseous CO2 can be delivered from the CO2 source to the membrane via a regulator valve 220. The regulator valve 220 can control the amount of gas from the CO2 source 105 that will enter the membrane module 115. Before entering the membrane module, the CO2 can be filtered by a filter 211 to remove particles from the CO2 gas.

In an exemplary embodiment of the present invention, the filter 211 is configured to remove particles larger than apertures 116 of the membrane module 115. As discussed above, CO2 can dissolve into the process-water in the membrane module 115 to form a process-water-CO2 solution. A sequestration duct 135, can then be used to transport the process-water-CO2 solution to a sequestration site 140. The sequestration duct 135 can comprise a bubble screen 230. The bubble screen 230 can be configured to prevent bubbles greater than a predetermined size from passing through the sequestration duct 135 and to the sequestration site 140. In an exemplary embodiment of the present invention, the bubble screen 230 is configured to prevent bubbles greater than a pore size of a saline aquifer from passing through the sequestration duct 135 to the saline aquifer. In some embodiments of the present invention, the system 100 comprises a plurality of pressure sensors/transducers 215, 216, and 217 positioned at various places in the system. The pressure sensors/transducers 215, 216, and 217 can be configured to measure pressure to ensure pressures at the various points are within predetermined thresholds.

The present invention overcomes many disadvantages of the prior art. A few of these advantages are discussed below. For example, by dissolving gaseous CO2 into the process-water prior to injection into a deep well saline aquifer, many of the fears associated with CO2 leakage back to the atmosphere can be reduced or even eliminated. In brines, the formation of carbonate from CO2 dissolution is inhibited by the high ionic strength of the brine. If the temperature is low enough, CO2-hydrates can be formed when CO2 gas is injected, which will dissolve slowly. This phenomenon was observed by experimenters for deep ocean injection of CO2. When CO2 is pre-dissolved into process-water, prior to injection, however, the bicarbonate ions are already formed before the water enters the aquifer. The bicarbonate ions then can readily produce carbonate ions used in the mineralization reactions within the aquifer.

Additionally, injecting a process-water-CO2 liquid solution into sequestration duct 135, instead of pure CO2 gas, provides for increased protection against uncontrolled corrosion of the deep well casing and sealing materials in two ways: (1) the measured corrosion rate for process-water-CO2 solution can be accounted for in sequestration duct/well 135 construction material selection; and (2) a corrosion inhibitor and/or modifications of chemistry, e.g., pH, can be used to reduce the measured corrosion rate.

In some embodiments of the present invention, the CO2 addition to the water serves to improve the behavior of the water. Such behavior can include its ability to form solid minerals that can be disadvantageous when they form inside the process piping, valves, and sequestration site deep well.

In some embodiments of the present invention, water injection can continue, even without CO2. The amount of CO2 supplied to the membrane module can vary from 0% to 100% of a pre-determined maximum amount without altering the amount of water arriving at the sequestration site.

For an operating power plant, availability issues will likely lie with the CO2 capture process, and it is less likely that injection water will be the item that is in short supply. Accordingly, some embodiments of the present invention allow the injection process startup and shutdown events to be smooth, with minimal sudden changes to pressure or flow in the deep well and aquifer. For example, during an outage, the deep well can be shut-in under pressure with a full column of liquid remaining in the sequestration duct and well injection tube.

In some embodiments of the present invention, the water in the duct to the sequestration site may be stopped under pressure, without fear of CO2 separating into a gas phase in the injection well and sequestration duct. This allows the injection process to be stopped indefinitely. This is a unique feature of the invention as it minimizes the risk of inducing seismic instability in the injection well when injection is re-started, as compared to traditional processes that use high pressure CO2 injection. The amount of pressure to be exerted at the ground surface on the water at the injection well can be minimized due to the fact that the CO2-treated water produced by the process is still incompressible. Therefore, only the pressure that is needed to move water down the injection well at a pre-determined rate need be applied, while overcoming friction in the sequestration duct, in the injection well, in between the well and the aquifer, and in the aquifer. Unlike for pure CO2 injection cases, energy is not expended in compressing the water in the water flow path from the ground surface all the way into the saline aquifer. The pressure to be applied is routinely determined by those skilled in the art of water injection well design.

In some embodiments of the present invention, the present invention more readily allows variable CO2 injection rate than for cases involving pure CO2 injection. In addition, some embodiments of the present invention accomplish the task of transporting the CO2 to the saline aquifer with little risk of sharp changes in temperature or pressure in the well and aquifer. These risks are heightened for pure CO2 injection cases.

In some embodiments of the present invention, the saline aquifer can remain open because the injection and mixing zones in the aquifer stay cooler than the surrounding formation temperature. These zones stay cooler due to continued water injection. The cooler temperature of injection water keeps the saturation indices for minerals from rising in the piping, well bore, and injection and mixing zones. Short periods of complete injection shutdown can also be accommodated due to the fact that the aquifer injection and mixing zones will take time to warm up again.

In some embodiments of the present invention, the present process allows for the injection well head pressure to vary from 400 psi to 750 psi, and this is in line with the pressures currently used by those practiced in the art of deep saline aquifer injection well design, although other pressures are also contemplated within the scope of the present invention. These low injection well head pressures help minimize seismic or other risks from the process. The lower pressure of the finished water also allows for greater personnel safety as related to above-ground piping and equipment.

As known by those knowledgeable in the art of deep injection well design for saline aquifers, necessary well head pressures are typically less than 800 psi for the injection water flow rates anticipated. Generally, water flows used for deep well injection design are less than 500 GPM per well. Often, the diameter and length of the injection tube are key factors that influence the needed well head pressure. In addition, aquifer properties measured by those knowledgeable in the art using in situ and laboratory sample testing means are used to determine the safe well head pressure to be applied. These methods are not unlike those that have been used safely for several decades by those practiced in the art.

In some embodiments of the present invention, the desired water injection pressure can be achieved by reducing the pressure of the water after it emerges from the membrane module while filtering (by means of an external filter) at the same time. The pressure reduction can be performed through the combined use of a control valve and an external downstream filter. In the depicted process, the pressure drop duties of the filter and the control valve combination can vary such that the total effect is to produce correctly pressurized water in the sequestration duct. In addition, the combined use of the filter and valve may not produce a measurable drop in temperature of the water even when the overall pressure drop is 200 psi or more. This would not be the case using injection of pure CO2.

In some embodiments of the present invention, the valve and filter combination provides a unique dual service of pressure reduction while maintaining the produced water as a single phase.

In some embodiments of the present invention, gaseous CO2 is used in the membrane module. The pressures of the CO2 and water in the membrane module can be such that liquid, dense phase and solid CO2 forms are avoided. In the process, the water pressure in the membrane module can be 750 psi. In another embodiment, the water pressure can be 700 psi. In yet another embodiment, the water pressure can be 800 psi. The present invention, however, is not necessarily limited to specific pressures.

In some embodiments of the present invention, the first pressure (that of the CO2) is such that it is near to but less than that at which the CO2 gas turns to liquid. In some embodiments of the present invention, the first pressure is chosen based on the measured temperatures of the CO2 gas and the water entering the membrane module.

In some embodiments of the present invention, a valve placed before the filter (see FIGS. 5 and 6) is used to adjust the third pressure (at the sequestration site) to be variable.

In some embodiments of the present invention, during operation, a single (liquid) phase is maintained in the water exiting the process. This process produces the water at the desired flow and pressure for direct connection to the deep well and then from there to the deep saline aquifer.

In some embodiments of the present invention, the CO2 gas pressure in the membrane module is such that liquid and solid CO2 forms are avoided. The CO2 gas pressure in the membrane module can stay above the water pressure in the membrane module by at least 30 psi. In this way, the present invention allows the membrane module tube materials to last longer. Accordingly, water in the membrane module can stay inside the water tubes instead of on the shell side (CO2 side) of the membrane during operation.

In some embodiments of the present invention, a multi-stage centrifugal pump provides water to the process for the design pressure and flow range needed by the membrane module and for injection. The pump operates such that the water pressure remains steady, and can be varied to some degree. The water pump is made of an appropriate alloy or made in such as way that wetted surfaces are made of a suitable alloy. The alloy selection is based on the water quality expected for the injection water. This process is well known to those practiced in the art of material selection under varying water quality.

In some embodiments of the present invention, the waters used can be corrosive and scaling in nature. The process can be flexible enough that costs added by material selection and possible use of scale inhibitors are not excessive. Other actions can include water treatment, filtration and pH adjustment prior to use in the current process. These actions can be decided through well known techniques practiced by those familiar to the art.

In some embodiments of the present invention, a filter can be built into the top end of each individual membrane module tube so that the CO2-treated water is filtered as it exits the top end of the tube. In some embodiments of the present invention, the pore size used for the filters at the top end of the membrane tubes and in the external filter is chosen in coordination with the pore size through which CO2 flows in the membrane module, and the pore size of the formation through which water flows in the saline aquifer (sequestration site). The pore size of the formation that is the saline aquifer can be determined by those practiced in the art.

In some embodiments of the present invention, only the amount of water needed to carry CO2 from the membrane module to the sequestration site is allowed to flow through the membrane module. If additional water is provided from the process water source, the additional water can proceed through the bypass section.

In some embodiments of the present invention, a clean water backwash can be used on the water filters used at the top end of each membrane tube and/or the water filter outside the membrane module. The clean water backwash can be used at the end of a process run to protect materials during periods of injection outage, and/or to clean the water filters. For example, the backwash can flow downward through the filter(s) and membrane module tubes and out through a drain valve.

In some embodiments of the present invention, a mass meter employing some physical characteristic of the water flowing inside the process pipe is used to measure the rate of movement of water into the membrane module. In some embodiments of the present invention, a mass meter employing some physical characteristic of the water flowing inside the process pipe is used to measure the rate of movement of processed water to the injection site. In some embodiments of the present invention, a mass meter employing some physical characteristic of the water flowing inside the process pipe is used to measure the rate of movement of water by-passing the membrane module on its way to the injection site. In some embodiments of the present invention, the change in weight of CO2 in a tank feeding the membrane module is used to measure the mass of CO2 arriving at the sequestration site. The present invention can make use of many mass meters known in the art, including, but not limited to, the ROTAMASS 3-Series Coriolis Mass Flowmeter manufactured by Yokogawa.

In some embodiments of the present invention, the water produced by the process will quickly reach a pre-determined release depth in the injection well in a very short time. In one embodiment, the in-pipe water flow velocity can be 10 ft/s, resulting in the water produced by the present invention reaching a pre-determined in-well release point at a depth of 3500 ft in 6 minutes. Embodiments of present invention, however, are not limited to specific flow velocities, depths, and times. Instead, various embodiments of the present invention may have different velocities, depths, and times.

In some embodiments of the present invention, the pressure of the water produced by the process on the Earth's surface is less than the static pressure of the water at the pre-determined in-well release depth, e.g., 3500 ft. At that depth, the confining pressure on the injected water is 1500 psi, relative to the well head pressure of 750 psi or less. Embodiments of the present invention, however, are not limited to specific depths and pressures. Instead, various embodiments of the present invention may have different depths and pressures.

In some embodiments of the present invention, to permit a start of the membrane process, the CO2 gas chamber can be raised to an operating pressure before any water enters the membrane module.

In some embodiments of the present invention, to permit a shutdown of the membrane process, the water in the membrane module can be forcibly drained from the membrane module by the passage of CO2 from the gas chamber of the membrane module to the atmosphere taking the water along with it.

In some embodiments of the present invention, the water produced by the process is capable of inducing sequestration of the CO2 in the saline aquifer by the conversion of the CO2 to stable carbonates. The carbonates are produced in a way that their formation is more encouraged at depths shallower than the release point of the water in the saline aquifer. The carbonates may not exert a partial pressure, unlike CO2, enabling natural sequestration to act on CO2 brought to the saline aquifer via the sequestration duct from the process.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A carbon dioxide ("$CO_2$") sequestration system comprising:
   a $CO_2$ source;
   a process-water source;
   a membrane module comprising:
      a first section configured to receive gaseous $CO_2$ at a first pressure from the $CO_2$ source;
      a second section configured to receive process-water at a second pressure from the process-water source; and
      a membrane positioned substantially between the first section and the second section, the membrane comprising a plurality of apertures configured such that the gaseous $CO_2$ in the first section passes through the plurality of apertures and dissolves into the process-water in the second section to form a process-water-$CO_2$ solution; and a sequestration duct in fluid communication with the second section of the membrane module, the sequestration duct configured to transport the process-water-$CO_2$ solution to a sequestration site, wherein the process-water source comprises a flue gas desulfurization system.

2. The $CO_2$ sequestration system of claim 1, wherein the sequestration site is a saline aquifer.

3. The $CO_2$ sequestration system of claim 2, wherein the first pressure and second pressure are such that process-water-$CO_2$ solution comprises $CO_2$-microbubbles having a diameter less than a diameter of pores of the saline aquifer.

4. The $CO_2$ sequestration system of claim 1, wherein the $CO_2$ source is configured to filter $CO_2$ from a process gas.

5. The $CO_2$ sequestration system of claim 1, wherein the first pressure is no more than 10 PSI greater than the second pressure.

6. The $CO_2$ sequestration system of claim 1, wherein the plurality of apertures have a diameter less than 20 microns.

7. The $CO_2$ sequestration system of claim 1, wherein the membrane comprises a first tubular-shaped membrane, an interior volume of the first tubular-shaped membrane defining a first portion of the second section, an exterior volume of the first tubular-shaped membrane defining a first portion of the first section.

8. The $CO_2$ sequestration system of claim 7, wherein the membrane further comprises a second tubular-shaped membrane, an interior volume of the second tubular-shaped membrane defining a second portion of the second section, an exterior volume of the second tubular-shaped membrane defining a second portion of the first section.

9. The $CO_2$ sequestration system of claim 1, wherein the membrane module further comprises a third section in fluid communication with the second section and the sequestration duct, the third section comprising a filter membrane comprising a second plurality of apertures, each of the second plurality of apertures having a diameter selected based on at least one of a pressure and temperature of at least one of the process water and gaseous $CO_2$, the filter membrane configured to prevent gaseous $CO_2$ bubbles having a diameter greater than the diameter of the second plurality of apertures from traversing across the filter membrane and entering the sequestration duct.

10. A method of sequestering carbon dioxide ("$CO_2$"), comprising:

utilizing a membrane module, the membrane module comprising:

a first section;
a second section; and
a membrane positioned substantially between the first section and the second section, the membrane comprising a plurality of apertures;

injecting gaseous $CO_2$ into the first section of the membrane module, such that the gaseous $CO_2$ is at a first pressure within the first section of the membrane module;

injecting process-water into the second section of the membrane module, and such that the process-water is at a second pressure within the second section of the membrane module, wherein the second pressure is less than the first pressure;

dissolving the gaseous $CO_2$ into the process-water via the plurality of apertures to form a process-water-$CO_2$ solution; and transporting the process-water-$CO_2$ solution to a sequestration site via a sequestration duct, wherein the process-water comprises a byproduct of a process-gas desulfurization process.

11. The method of claim 10, wherein the sequestration site is a saline aquifer.

12. The method of claim 11, wherein the first pressure and the second pressure are selected to create $CO_2$-microbubbles in the process-water-$CO_2$ solution, the $CO_2$-microbubbles having a diameter no greater than a diameter of pores of the saline aquifer.

13. The method of claim 10, further comprising filtering the gaseous $CO_2$ from a process gas prior to injecting the gaseous $CO_2$ into the first section of the membrane module.

14. The method of claim 13, wherein the process gas is a flue gas of an electric power plant.

15. The method of claim 10, wherein the process-water comprises at least one of calcium, sodium, potassium, barium, iron, magnesium, copper, lead, cadmium, manganese, zinc and strontium.

16. The method of claim 10, wherein the first pressure is no more than 10 PSI greater than the second pressure.

17. The method of claim 10, wherein the process-water-$CO_2$ solution in the sequestration duct is at a third pressure substantially equal to the second pressure.

18. The method of claim 10, wherein the plurality of apertures have a diameter less than 20 microns.

* * * * *